US008840286B1

(12) United States Patent
Freeman

(10) Patent No.: US 8,840,286 B1
(45) Date of Patent: Sep. 23, 2014

(54) BOAT LIGHTING SYSTEM

(76) Inventor: Lennis Freeman, Jacksonville, NC (US)

( * ) Notice: Subject to any disclaimer, the term of this patent is extended or adjusted under 35 U.S.C. 154(b) by 219 days.

(21) Appl. No.: 13/589,634

(22) Filed: Aug. 20, 2012

(51) Int. Cl.
*B60Q 1/00* (2006.01)
*F21V 1/00* (2006.01)

(52) U.S. Cl.
USPC .......... 362/477

(58) Field of Classification Search
USPC .......... 362/477
See application file for complete search history.

(56) References Cited

U.S. PATENT DOCUMENTS 2,968,208 A * 1/1961 Shaw .......... 359/406

* cited by examiner

*Primary Examiner* — Jason Moon Han

(74) *Attorney, Agent, or Firm* — Gulf Coast Intellectual Property Group

(57) ABSTRACT

A boat lighting system operably coupled to the bow of a boat wherein the boat lighting system is operable to illuminate at least a portion of the underwater proximate the bow of the boat. The boat lighting system further includes a horizontal main support beam that is releasably secured to a boat using a pair of hull fasteners. Coupled to the main support beam are three light poles that are vertically adjustable. Secured to one end of the three light poles are light assemblies that are generally waterproof and configured to illuminate the water. An upper shield is further included with the light assembly so as to inhibit light from traveling in an upwards direction. The boat lighting system is releasably secured to a bow of a boat.

20 Claims, 3 Drawing Sheets

BOAT LIGHTING SYSTEM

FIELD OF THE INVENTION

The preset invention related to boat lighting systems, more specifically but not by way of limitation, a boat lighting system secured to the bow of a boat wherein the lighting system is operable to illuminate under the surface of the water on which the boat is superposed.

BACKGROUND

Fishing is a popular sport in many countries of the world and has an annual participation rate in the United States of over 20 million. There are numerous types of fishing styles and techniques that require the use of different equipment. Offshore fishing usually involves the pursuit of large pelagic species and requires the use of specialized equipment such as but not limited to heavy-duty rod and reel combinations. Inshore fishing can be accomplished either from a boat or by land and is popular both in fresh water and salt water. Many different styles of inshore fishing exist and ranges from fly-fishing to spearing.

One popular method of inshore fishing in some regions is referring to as gigging. Gigging is a style of spear fishing that is typically executed from a boat in shallow water in the pursuit of common bottom species such as but not limited to flounder. Gigging typically involves the use of a pole spear or similar device and a boat wherein the boat is operated in very shallow water and the fisherman closely surveys the bottom of the body of water that they are traversing looking for species that are at least partially concealed in the bottom. Typically the bottom is comprised of sand and/or mud and species such as flounder often partially bury themselves in order to camouflage themselves and attack unsuspecting prey as the prey swims proximate the flounder. As fisherman survey the bottom while operating the boat at a slow speed, the fisherman is examining the bottom for the outline or silhouette of the fish species being targeted. Once spotted, the fisherman will utilize a pole spear or similar device in order to attempt to capture the fish.

Gigging can be performed both during the day or night but is routinely performed at night. While gigging at night, fisherman will attempt to light up the area of water proximate the boat in order to improve the chance of identifying a targeted species on the bottom. Many fishermen will use a flashlight or similar device to illuminate the water while engaged in gigging at night. One problem with this method is that it is cumbersome for the fisherman to manipulate a pole spear and a hand-held light. This can often result in a missed opportunity as the fisherman fumbles the pole spear and allows the targeted species to escape.

Another issue with utilization of a hand-held light during gigging at night is reflection. As a fisherman shines a light on the surface of the water, a portion of the light is reflected which causes visibility issues. The reflected light reduces the night vision of the fisherman and also results in poor illumination of the bottom of the body of water.

Accordingly, there is a need for a boat light system that illuminates the water proximate the bow of a boat wherein the lighting system is releasably secured to the boat and is further submersible in the water and functions to reduce reflections of the light generated by the system.

SUMMARY OF THE INVENTION

It is the object of the present invention to provide a boat lighting system that is operable to illuminate under the surface of the water proximate the bow of the boat.

Another object of the present is to provide a boat lighting system that is operable to be releasably secured to the bow of the boat.

A further object of the present invention is to provide a boat lighting system that is operable to illuminate under the surface of the water proximate the bow of a boat that further includes a main support member that extends across the beam of the boat.

Still another object of the present invention is to provide a boat lighting system operable to assist a fisherman engaged in gigging at night that utilizes mounting brackets to releasably secure the main support member across the beam of the boat.

Yet a further object of the present invention is to provide a boat lighting system that is operable to illuminate under the surface of the water proximate the bow of the boat that includes at least one light support member that extends downward into the water.

An additional object of the present invention is to provide a boat lighting system that is operable to illuminate the surface under the water proximate the bow of a boat that includes a light secured to the submerged end of the light support member that is configured to project light in a downward direction.

A further object of the present invention is to provide a boat lighting system that is powered by DC voltage and is lightweight.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
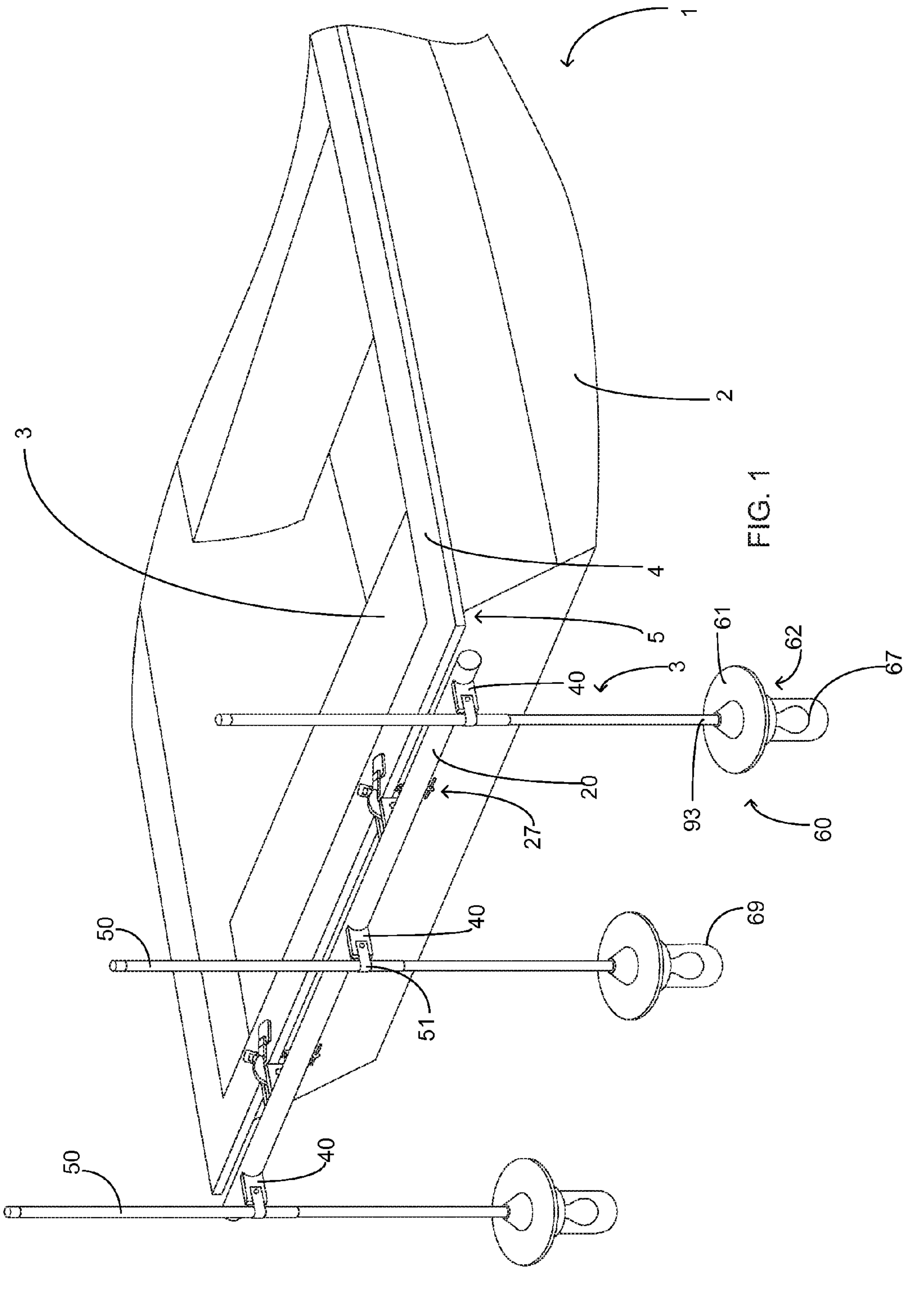
FIG. 1 is a perspective view of the present invention secured to a hull of a boat.

Referring now to the drawings submitted herewith, wherein various elements depicted therein are not necessarily drawn to scale and wherein through the views and figures like elements are referenced with identical reference numerals, there is illustrated a boat lighting system 100 constructed according to the principles of the present invention.

The boat lighting system 100 includes a main support beam 10 that is generally elongated in shape and is constructed from a suitable durable material such as but not limited to non-corrosive metal. The main support beam 10 provides the structural support for the boat lighting system 100. The main support beam 10 is of sufficient length so as to extend substantially across the beam of the hull 2. The main support beam 10 is proximate the gunwale 4 of the hull 2 and is generally parallel therewith being mounted such that it is not disposed on the deck 3 of the hull 2. This configuration eliminates tripping hazards and maintains a safer environment on the deck 3. While the main support beam 10 is illustrated as being rod-shaped herein, it is contemplated within the scope of the present invention that the main support beam 10 could be formed in numerous different shapes.

Figure 2:
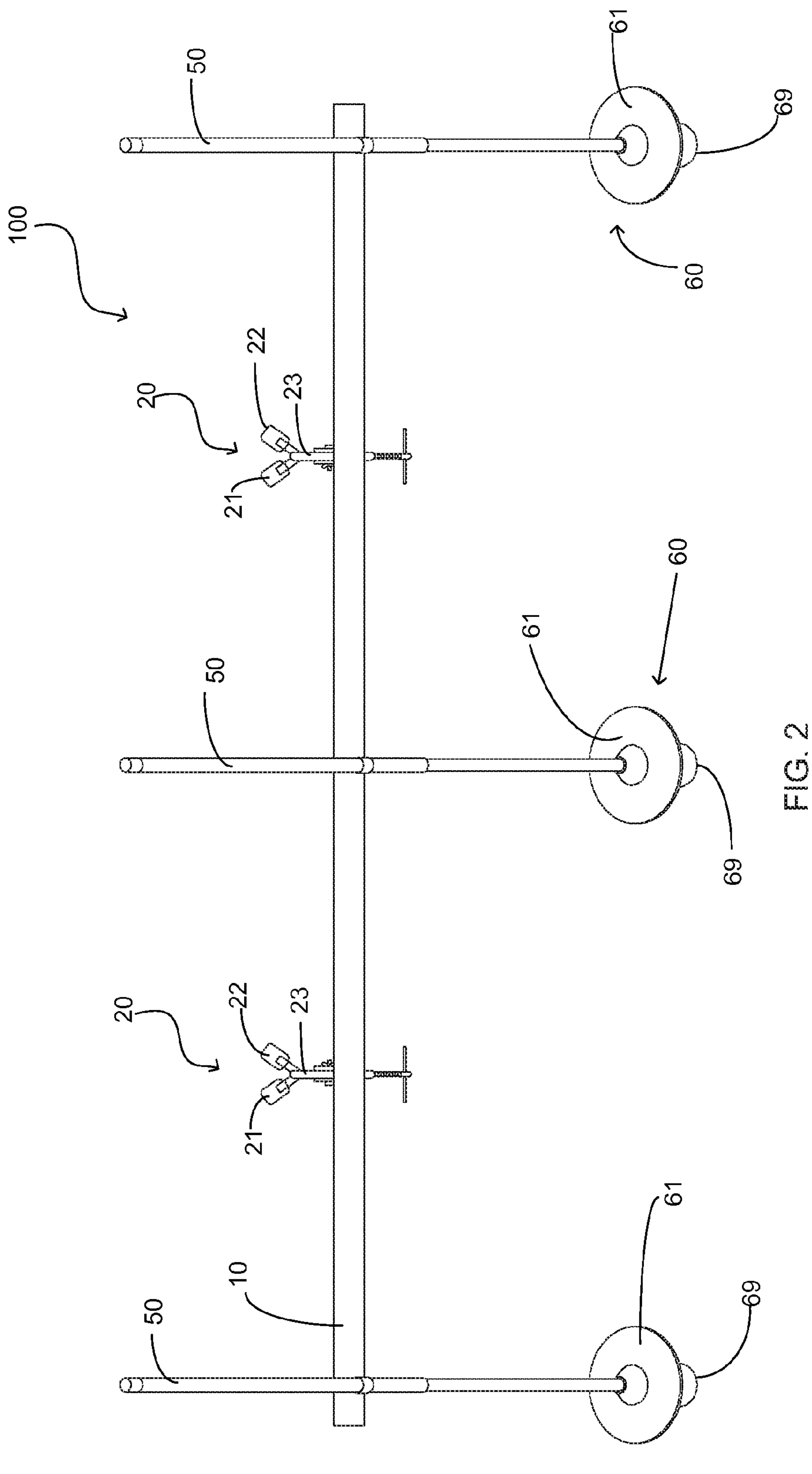
FIG. 2 is a side view of the present invention.

As shown in particular in FIG. 2, the main support beam 10 includes hull fasteners 20. The hull fasteners 20 function to releasably secure the boat lighting system 100 to the gunwale 4 of the hull 2. The hull fasteners 20 include a first upper support member 21 and second upper support member 22 that are operably coupled to support bar 23. The first upper support member 21 and second upper support member 22 are configured in a general y-shaped configuration. This configuration promotes greater stability of the boat lighting system 100 subsequent mounting to the hull 2. The first support member 21, second support member 22 and support bar 23 are manufactured from suitable durable material such as but not limited to non-corrosive metal. The support bar 23 is operably coupled to bracket 30. Bracket 30 is integrally secured to the main support beam 10 utilizing suitable durable methods such as but not limited to welding. The bracket 30 is extends outward from the main support beam 10 and is generally perpendicular thereto. The bracket 30 includes a first member 31 and second member 32 that are generally parallel having a void 33 intermediate thereto. The void 33 is of suitable size to accommodate a portion of the support bar 23 therein. A fastener 34 is operable to secure the support bar 23 within the void 33 of the bracket 30. Those skilled in the art will recognize that the fastener 34 could be numerous styles of conventional fasteners such as but not limited to a nut and bolt. The hull fastener 20 further includes a bottom adjustment member 27 that is operable to secure to the bottom surface 5 of the gunwale 4. The bottom adjustment member 27 consists of a threaded rod 26 having a t-bar 25 coupled thereto that is operable to be rotated so as to engage the contact member 29 with the bottom surface 5 of the gunwale 4. While there are 2 hull fasteners 20 illustrated herein, it is contemplated within the scope of the present invention that the boat lighting system 100 could have any number of hull fasteners 20.

Figure 3:
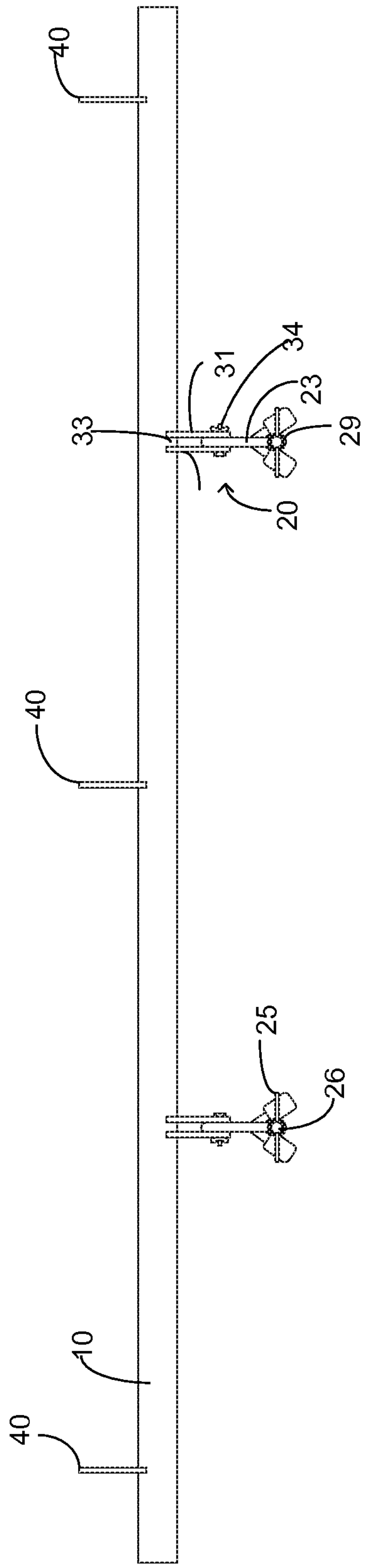
FIG. 3 is a bottom view of the main support beam of the present invention.

Referring in particular to FIG. 3, a plurality of light connection members 40 are illustrated therein. The light connection members 40 are generally rectangular in shape being integrally secured to the main support beam 10 utilizing suitable durable techniques such as but not limited to welding. The light connection member 40 extends outward from the main support beam 10 and is generally perpendicular thereto. The light connection member 40 functions to operably engage the light posts 50. While three light connection members 40 are illustrated herein, it is contemplated within the scope of the present invention that the boat lighting system 100 could have any number of light connection members 40.

As shown in FIG. 1, the light posts 50 are operably secured to the light connection members' 40 using brackets 51. The light posts 50 are constructed of tubular metal having an interior passage (not illustrated herein) so as to accommodate conventional electrical wiring. The light posts 50 are vertically adjustable with respect to the gunwale 4 in order to properly place the light assembly 60 in the correct position underwater. It is contemplated within the scope of the present invention that the light posts 50 could be manufactured in numerous different lengths to accommodate different style hulls 2.

A light assembly 60 is coupled to the second end 93 of the light post 50. The light assembly 60 consists of an upper disc 61 that is generally annular in shape extending having the light post 50 mounted proximate in the center thereof. The upper disc 61 functions to block light from the bulb 67 and substantially inhibit the light from the bulb 67 projecting towards the hull 2. The upper disc 61 includes a lower surface 62 that is manufactured from a reflective material that further functions to direct the light projecting from the bulb 67 in a generally downward direction. The upper disc 61 is operable to substantially inhibit light from the bulb 67 from traveling in a generally upward direction therepast so as to protect the night vision of a user standing on the deck 3. It is further contemplated within the scope of the present invention that the upper disc 61 could be constructed in numerous different shapes and sizes in order to accomplish the desired objective as stated herein.

The light assembly 60 further includes a bulb case 69. The bulb case 69 is secured to the upper disc 61 using suitable waterproof techniques so as to inhibit water from propagating thereinto. The bulb case 69 is manufactured from a durable translucent plastic and is operable to protect the bulb 69 from impact with objects as well as the water. It is contemplated within the scope of the present invention that the bulb case 69 could be formed in numerous sizes and shapes to accommodate different styles of bulbs 67. The bulb 67 is a conventional 12V DC bulb that is operably coupled to the electrical system of the boat 1 utilizing conventional techniques.

Referring in particular to FIG. 1, a description of the operation of the boat lighting system 100 is as follows. In use, the user will place the main support beam 10 proximate the bow gunwale 4 of the boat 1 and secure thereto utilizing the hull fasteners 20. The light posts 50 are vertically adjusted so as to submerge the light assembly 60 underneath the surface of the water on which the boat 1 is floating. The boat lighting system 100 is operably coupled to the electrical system of the boat 1 utilizing conventional techniques. As the boat 1 moves forward through the water, the user stands on the deck 3 and peers into the water to observe for a targeted species. The upper disc 61 of the light assembly 60 facilitates improved viewing by inhibiting the destruction of the night vision of the user.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A boat lighting system comprising:

a main support beam, said main support beam being elongated in shape and substantially rigid;

at least one hull fastener, said at least one hull fastener secured to said main support beam, said at least one hull fastener operable to secure to a hull of a boat;

at least one light pole, said at least one light pole operably coupled to said main support beam, said at least one light pole being perpendicular in orientation with respect to said main support beam;

at least one light assembly, said at least one light assembly secured to said at least one light pole, said at least one light assembly operable to be submerged underwater; and wherein the boat lighting system is operable to be releasably secured to the bow of a boat.

2. The boat lighting system as recited in claim 1, wherein said light assembly further includes a shield, said shield being located proximate the top of said light assembly, said shield operable to prevent light from traveling upwards toward the boat.

3. The boat lighting system as recited in claim 2, wherein said hull fastener further includes an first upper support member and a second upper support member, said first upper support member and said second upper support member configured in a y-shape being operable to engage a gunwale of a boat.

4. The boat lighting system as recited in claim 3, and further including at least one hull fastener bracket, said at least one hull fastener bracket being secured to said main support beam, said at least one hull fastener bracket operably coupled with said at least one hull fastener.

5. The boat lighting system as recited in claim 4, wherein said at least one light assembly includes a bulb case, said bulb case being substantially waterproof, said bulb case being transparent.

6. The boat lighting system as recited in claim 5, wherein shield further includes a lower surface, said lower surface having a reflective coating thereon.

7. The boat lighting system as recited in claim 6, and further including at least one light pole bracket, said at least one light pole bracket operable to secure at said at least one light pole to said main support beam.

8. A boat light assembly operably to provide illumination to a portion of the water on which the boat is floating comprising:

a main support member, said main support member being an elongated rod and substantially rigid, said main support member being generally horizontal in orientation;

a plurality of hull fasteners, said plurality of hull fasteners secured to said main support member, said plurality of hull fasteners operable to secure said main support member to a hull of a boat;

a plurality of light poles, said plurality of light poles operably coupled to said main support member, said plurality of light poles being perpendicular in orientation with respect to said main support member, said plurality of light poles being rod-shaped, said plurality of light poles having a first end and a second end;

a plurality of light assemblies, said plurality of light assemblies secured to said plurality of light poles proximate said second end, said plurality of light assemblies operable to be submerged underwater; and wherein the boat lighting system is operable to be releasably secured to the bow of a boat.

9. The boat lighting system as recited in claim 8, wherein said plurality of hull fasteners further include an upper portion, said upper portion consisting of a first member and a second member, said first member and said second member operably coupled in a y-configuration.

10. The boat lighting system as recited in claim 9, wherein said plurality of light assemblies further include an upper shield, said upper shield operable to direct light from said plurality of light assemblies in a downward direction.

11. The boat lighting system as recited in claim 10, wherein said plurality of hull fasteners further includes a bottom portion, said bottom portion being adjustable, said bottom portion operable to engage at portion of a gunwale of a boat.

12. The boat lighting system as recited in claim 11, wherein said upper shield further includes an upper surface and a lower surface, said lower surface having disposed thereon a reflective coating.

13. The boat lighting system as recited in claim 12, and further including a plurality of hull fastener brackets, said plurality of hull fastener brackets being secured to said main support member, said plurality of hull fastener brackets operable to couple said plurality of hull fasteners to said main support member.

14. The boat lighting system as recited in claim 13, wherein said plurality of hull fastener brackets include a first member and a second member, said first member and said second member being generally parallel with a void therebetween configured to accept a portion of said plurality of said hull fasteners.

15. A boat lighting system operably coupled to a bow of a boat configured to illuminate a portion of the underwater proximate the bow of the boat comprising:

a main support member, said main support member being an elongated rod and substantially rigid, said main support member being generally horizontal in orientation;

two hull fasteners, said two hull fasteners secured to said main support member, said two hull fasteners operable to secure said main support member to a hull of a boat, said two hull fasteners having an upper portion, said upper portion of said two hull fasteners further including a first member and a second member, said first member and said second member configured in a y-shaped manner;

three light poles, said three light poles operably coupled to said main support member, said three light poles being perpendicular in orientation with respect to said main support member, said three light poles being rod-shaped, said three light poles having a first end and a second end, said three light poles being vertically adjustable with respect to said main support member;

three light assemblies, said three light assemblies secured to said three light poles proximate said second end, said three light assemblies operable to be submerged underwater, said three light assemblies operable to illuminate a portion of the underwater proximate the boat, said three light assemblies further including an upper shield, said upper shield being annular in shape, said upper shield operable to inhibit light from traveling upwards toward the boat.

16. The boat lighting system as recited in claim 15, and further including two hull fastener brackets, said two hull fastener brackets being secured to said main support member, said two hull fastener brackets operable to couple said two hull fasteners to said main support member, said two hull fastener brackets including a first member and a second member, said first member and said second member being generally parallel having a void therebetween, said void operable to receive a portion of said two hull fasteners.

17. The boat lighting system as recited in claim 16, wherein said two hull fasteners further includes a bottom portion, said bottom portion being adjustable, said bottom portion operable to engage at portion of a gunwale of a boat.

18. The boat lighting system as recited in claim 17, wherein said upper shield further includes an upper surface and a lower surface, said lower surface having disposed thereon a reflective coating.

19. The boat lighting system as recited in claim 18, and further including three light pole brackets, said three light pole brackets being rectangular in shape and planar in manner, said three light pole brackets extending generally parallel from said main support member, said three light pole brackets operably coupled to said three light poles.

20. The boat lighting system as recited in claim 19, wherein said bottom portion of said two hull fasteners further include a contact member, said contact member being annular in shape, said contact member operable to engage the hull of the boat.

* * * * *